(12) United States Patent
Arrasvuori et al.

(10) Patent No.: US 8,832,552 B2
(45) Date of Patent: Sep. 9, 2014

(54) AUTOMATED SELECTION OF AVATAR CHARACTERISTICS FOR GROUPS

(75) Inventors: Juha Arrasvuori, Tampere (FI); Elina Ollila, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 961 days.

(21) Appl. No.: 12/080,520

(22) Filed: Apr. 3, 2008

(65) Prior Publication Data

US 2009/0254859 A1    Oct. 8, 2009

(51) Int. Cl.
*G06F 3/048*    (2013.01)

(52) U.S. Cl.
USPC .......................................... 715/706; 715/757

(58) Field of Classification Search
USPC ................................................ 715/706, 757
See application file for complete search history.

(56) References Cited

U.S. PATENT DOCUMENTS

| | | | |
|---|---|---|---|
| 4,738,451 A * | 4/1988 | Logg ................................. | 463/2 |
| 5,754,939 A * | 5/1998 | Herz et al. .................... | 455/3.04 |
| 6,260,019 B1 * | 7/2001 | Courts .......................... | 705/7.31 |
| 6,450,888 B1 * | 9/2002 | Takase et al. ................... | 463/43 |
| 6,468,155 B1 * | 10/2002 | Zucker et al. ................... | 463/23 |
| 6,672,961 B1 | 1/2004 | Uzun | |
| 7,024,228 B2 | 4/2006 | Komsi et al. | |
| 7,035,653 B2 * | 4/2006 | Simon et al. .................. | 455/466 |
| 7,145,454 B2 | 12/2006 | Linjama et al. | |
| 7,248,677 B2 * | 7/2007 | Randall et al. ............. | 379/93.23 |
| 7,346,654 B1 * | 3/2008 | Weiss ............................ | 709/204 |
| 7,452,268 B2 * | 11/2008 | Annunziata ....................... | 463/1 |
| 7,468,729 B1 * | 12/2008 | Levinson ...................... | 345/473 |
| 7,587,338 B2 * | 9/2009 | Owa ............................. | 705/26.1 |
| 7,925,703 B2 * | 4/2011 | Dinan et al. ................... | 709/206 |
| 7,966,567 B2 * | 6/2011 | Abhyanker .................... | 715/757 |
| 8,108,774 B2 * | 1/2012 | Finn et al. ...................... | 715/706 |
| 8,281,240 B2 * | 10/2012 | Finn et al. ...................... | 715/706 |
| 2001/0034635 A1 * | 10/2001 | Winters .......................... | 705/10 |
| 2002/0107072 A1 * | 8/2002 | Giobbi ........................... | 463/42 |

(Continued)

FOREIGN PATENT DOCUMENTS

| | | |
|---|---|---|
| CN | 1879308 A | 12/2006 |
| EP | 1104143 | 5/2001 |

(Continued)

OTHER PUBLICATIONS

File History for U.S. Appl. No. 11/828,820.

(Continued)

*Primary Examiner* — Dennis-Doon Chow
*Assistant Examiner* — Shen Shiau
(74) *Attorney, Agent, or Firm* — Ditthavong & Steiner, P.C.

(57) ABSTRACT

Systems, apparatuses, and methods for automating avatar selection for groups are disclosed. A representative method includes providing a software application accessible to multiple users, and a database of available avatar characteristics that are selectively combinable to create user-specific avatars with which the users can represent themselves to each other in the application. User(s) associated with a group provide an instruction that associates a first set of the available avatar characteristics with the group. For users associated with the group, access is then restricted to the first set of avatar characteristics, and for users not associated with the group, access is restricted to a different second set of available avatar characteristics. Avatar characteristics in the first set may be selected by an automated procedure that analyzes user-specific avatars of some users, and selects which of the available avatar characteristics to include in the first set based on the analysis.

21 Claims, 9 Drawing Sheets

(56) References Cited

U.S. PATENT DOCUMENTS

| | | | |
|---|---|---|---|
| 2002/0198003 A1 | 12/2002 | Klapman | |
| 2003/0126430 A1* | 7/2003 | Shimada et al. | 713/155 |
| 2003/0156134 A1 | 8/2003 | Kim | |
| 2003/0224856 A1* | 12/2003 | Bukovsky et al. | 463/42 |
| 2003/0233650 A1* | 12/2003 | Zaner et al. | 725/32 |
| 2004/0009816 A1* | 1/2004 | Miller | 463/42 |
| 2004/0014527 A1* | 1/2004 | Orr et al. | 463/43 |
| 2004/0029625 A1* | 2/2004 | Annunziata | 463/1 |
| 2004/0030787 A1* | 2/2004 | Jandel et al. | 709/229 |
| 2004/0075677 A1* | 4/2004 | Loyall et al. | 345/706 |
| 2004/0210661 A1* | 10/2004 | Thompson | 709/228 |
| 2004/0243672 A1* | 12/2004 | Markki et al. | 709/204 |
| 2005/0210419 A1 | 9/2005 | Kela et al. | |
| 2005/0212758 A1 | 9/2005 | Marvit et al. | |
| 2006/0068917 A1* | 3/2006 | Snoddy et al. | 463/42 |
| 2006/0069694 A1* | 3/2006 | Rossi et al. | 707/101 |
| 2006/0075397 A1* | 4/2006 | Kasahara | 717/170 |
| 2006/0080175 A1* | 4/2006 | Rowe et al. | 705/14 |
| 2006/0100020 A1* | 5/2006 | Kasai | 463/42 |
| 2006/0235981 A1* | 10/2006 | Westman et al. | 709/227 |
| 2006/0256082 A1 | 11/2006 | Cho et al. | |
| 2006/0259957 A1* | 11/2006 | Tam et al. | 726/3 |
| 2007/0026869 A1 | 2/2007 | Dunko | |
| 2007/0166690 A1 | 7/2007 | Johnson | |
| 2007/0175998 A1* | 8/2007 | Lev | 235/454 |
| 2007/0240119 A1 | 10/2007 | Ducheneaut et al. | |
| 2007/0268299 A1* | 11/2007 | Jung et al. | 345/581 |
| 2007/0273583 A1 | 11/2007 | Rosenberg | |
| 2007/0298866 A1 | 12/2007 | Gaudiano et al. | |
| 2008/0045184 A1* | 2/2008 | Randall et al. | 455/412.2 |
| 2008/0091692 A1* | 4/2008 | Keith et al. | 707/100 |
| 2008/0120113 A1* | 5/2008 | Loyall et al. | 704/270 |
| 2008/0158222 A1* | 7/2008 | Li et al. | 345/418 |
| 2008/0163379 A1* | 7/2008 | Robinson et al. | 726/27 |
| 2008/0235216 A1* | 9/2008 | Ruttenberg | 707/5 |
| 2008/0235604 A1* | 9/2008 | Ebert | 715/763 |
| 2008/0268418 A1* | 10/2008 | Tashner et al. | 434/365 |
| 2009/0002479 A1* | 1/2009 | Sangberg et al. | 348/14.02 |
| 2009/0044113 A1* | 2/2009 | Jones et al. | 715/707 |
| 2009/0100076 A1* | 4/2009 | Hamilton et al. | 707/100 |
| 2009/0106673 A1* | 4/2009 | Jung et al. | 715/757 |
| 2009/0150778 A1* | 6/2009 | Nicol, II | 715/706 |
| 2009/0157482 A1* | 6/2009 | Jung et al. | 705/10 |
| 2009/0157570 A1* | 6/2009 | Pall et al. | 706/11 |
| 2009/0201299 A1* | 8/2009 | Bhogal et al. | 345/474 |
| 2009/0259648 A1* | 10/2009 | Bokor et al. | 707/5 |
| 2009/0276412 A1* | 11/2009 | Anderson et al. | 707/5 |
| 2009/0300493 A1* | 12/2009 | Hamilton et al. | 715/706 |
| 2009/0300525 A1* | 12/2009 | Jolliff et al. | 715/764 |
| 2010/0050237 A1* | 2/2010 | Bokor et al. | 726/4 |
| 2010/0053187 A1* | 3/2010 | Arrasvuori et al. | 345/581 |
| 2010/0070885 A1* | 3/2010 | Bromenshenkel et al. | 715/757 |
| 2010/0083148 A1* | 4/2010 | Finn et al. | 715/764 |
| 2010/0304814 A1* | 12/2010 | Coleman et al. | 463/9 |
| 2011/0099019 A1* | 4/2011 | Zopf | 704/500 |

FOREIGN PATENT DOCUMENTS

| | | | | |
|---|---|---|---|---|
| GB | 2447094 A | * | 9/2008 | A63F 13/12 |
| JP | 2007203112 A | * | 8/2007 | |
| KR | 20020070754 | | 9/2002 | |
| WO | WO2005076114 | | 8/2005 | |
| WO | WO 2007/052117 A1 | | 5/2007 | |
| WO | WO 2008/005149 A2 | | 1/2008 | |

OTHER PUBLICATIONS

Office Action for related Chinese Application No. 200980111026.0 dated May 28, 2012, pp. 1-8.
Office action with English translation from Korean Application No. 2010-7004361 dated Jan. 2, 2012, 7 pages.
Office Action for related Chinese Patent Application No. 200880025621.8 dated Jul. 20, 2012, pp. 1-9.
Office Action for related Chinese Patent Application No. 200980111026.0 dated Dec. 31, 2012, pp. 1-8.
Supplementary European Search Report for European Patent Application No. 09 72 8700 dated Dec. 12, 2012, pp. 1-7.
European Office Action for corresponding Patent Application No. 09728700.7 dated Aug. 29, 2013, 7 pages.

* cited by examiner

GENDER

AGE

HAIR

CLOTHING

ACCESSORIES

COLORS

MOVEMENT/ANIMATION

SOUNDS

RULES

GENDER

AGE

HAIR

CLOTHING

ACCESSORIES 62

COLORS 64

MOVEMENT/ANIMATION

SOUNDS

RULES

AUTOMATED SELECTION OF AVATAR CHARACTERISTICS FOR GROUPS

FIELD OF THE INVENTION

This invention relates generally to electronic devices and associated software involving user-specific representations such as avatars, with particular applicability to systems, apparatuses, and methods for facilitating automated definition and/or selection of common characteristics of such representations associated with a group.

BACKGROUND OF THE INVENTION

People have a basic need to communicate and interact with each other. In the modern world, this need is often met using electronic networking systems.

An example of such a system is a game application running on a server, or on a local device connected to a server. The application may be simple or complex, for example, it may define virtual beings, places, and things. Users may access the application via a suitable network, e.g. a Local Area Network (LAN) or a Global Area Network (GAN) such as the Internet, using computers or other electronic access devices. The application allows users to interact, via their respective access devices, with the virtual beings, places, and things, as well as with the other users. The application also includes the capability for each particular user to define a character or representation of himself or herself, known as an "avatar". The particular avatar, usually in the form of a 2-dimensional or pseudo 3-dimensional image or icon, is presented to other users who encounter such particular user in the application, in order to represent or identify the particular user to the others. "Identify" in this regard means to associate a particular avatar with a particular user for purposes of the game application, even though the real-world identity of the user may remain unknown to the other users.

In order to establish a user-specific avatar, each user may use his or her access device to select from a menu of available avatar characteristics provided by the game application. The application then generates an avatar for that particular user from the selected avatar characteristics, and thereafter uses that user-specific avatar in connection with that user.

In this regard, it is known to use templates in the creation of avatars. With these templates, the avatar can be divided into different parts such as hair, face, hands, upper body, lower body, and feet. The user selects a body part and gets a list of different options for that part, for example, all available different haircuts. Korean patent publication KR20020070754 is an example of a document relating to the use of templates for creating avatars and changing their appearance.

As such multi-user or multi-participant games become more widespread, new ways of interacting become desirable. Participation in games, shared applications, and other interactive technologies are expanding beyond small numbers of users, and existing manners for creating avatars and other personifications, though convenient for dealing with individuals, are not so convenient for dealing with groups. Current avatar creation methodologies, for example, fail to adequately empower groups and their members to control group-related aspects of their avatars and the avatars of other users.

The inventors have developed methods, devices, and systems that address these and other problems of the prior art, and facilitate defining and otherwise working with and utilizing avatars for multi-participant networked applications.

BRIEF SUMMARY

The present application discloses, inter alia, systems, apparatuses, and methods for automating the selection of avatars associated with groups. In one method, a software application is provided to be accessible to a plurality of users, and a database of available avatar characteristics is provided. The application can selectively combine the available avatar characteristics to create a variety of user-specific avatars. Some of the users are associated with a group, and some of the users are not associated with the group. For enhanced user control, the application can receive an instruction or other indication, from at least one user associated with the group, that associates a first set of the available avatar characteristics with the group. The instruction may be or include, for example, a listing of the first set of available avatar characteristics that has been selected by such at least one user associated with the group, and/or a command or trigger that causes the software application to generate such a listing. The method can include restricting access for users associated with the group to the first set of the available avatar characteristics, and restricting access for users not associated with the group to a second set of the available avatar characteristics, the first and second sets being different. In some cases the first set may be a subset of the second set. In some cases the first set may contain one or more avatar characteristics not contained in the second set. In some cases the group may be one of many different groups, each group having different sets of avatar characteristics associated with them. Users' access may be restricted by presenting to each user via a checklist, template, or other user interface only those ones of the available avatar characteristics that are compatible with such user's group status, e.g., whether the user is a member of a particular group or not. This automated procedure can simplify the user's selection process when they are engaged in creating or modifying their user-specific avatar.

Methods are also disclosed in which the process of identifying particular avatar characteristics that may be suitable for (permissive or obligatory) use with a group can be automated. Such process may include analyzing the user-specific avatars of at least some of the plurality of users, and defining the first set of avatar characteristics based on the analysis. The analysis may include, for example, identifying common avatar characteristics of users who are, or will become, members of the group. The analysis may also or instead include identifying ones of the available avatar characteristics that are not being used by users who are not members of the group.

Methods are also disclosed that include hosting a multi-participant application in which participants are represented as avatars, recognizing some of the participants as affiliated with a group, and recognizing others of the participants as not affiliated with the group, and providing a set of available avatar characteristics from which participants can select to create their respective user-specific avatars, but wherein only a first subset of the available avatar characteristics is provided to the participants affiliated with the group.

Methods are also disclosed that include hosting a multi-participant application in which participants are represented as avatars, and providing a set of available avatar characteristics from which participants can select to create their respective user-specific avatars. Further included is recognizing a plurality of the participants as affiliated with a group, and receiving an instruction from at least one participant affiliated with the group that associates a first subset of the available avatar characteristics with the group. After the receiving step, the providing step provides only the first subset of available avatar characteristics to the participants affiliated with the group.

Corresponding apparatuses for storing executable instructions for causing these and other methods are also disclosed.

In accordance with another embodiment an apparatus is disclosed that includes storage configured to store a multi-participant application in which participants are represented as avatars, and for storing a set of available avatar characteristics from which the participants can select to create their respective avatars. A receiver receives an indication from at least one participant affiliated with the group that associates a first subset of the available avatar characteristics with the group. A processor is configured to recognize multiple participants as affiliated with a group, and to identify from the set of available avatar characteristics a first subset of avatar characteristics associated with the group. The processor is further configured to limit or otherwise restrict at least some of the avatar characteristics available to the participants affiliated with the group to the first subset of avatar characteristics.

According to more particular embodiments of such an apparatus, a receiver is further provided to receive an indication from at least one participant affiliated with the group that specifies the first subset of avatar characteristics, where the processor is configured to identify the first subset of avatar characteristics based on the received indication specifying the first subset of avatar characteristics.

In still other embodiments of such an apparatus, the processor is further configured to identify common characteristics selected by participants affiliated with the group. The identification of the first subset of avatar characteristics may be based at least in part on the identification of the common characteristics selected by the participants affiliated with the group. In yet another embodiment, the processor is further configured to designate one or more of the avatar characteristics of the first subset as mandatory avatar characteristics for each of the participants affiliated with the group, and in a more particular embodiment the processor may be further configured to allow participants affiliated with the group to select any of the available avatar characteristics that are not designated as mandatory avatar characteristics. Another embodiment involves the processor designating one or more of the available avatar characteristics, that are not affiliated with the first subset, as prohibited avatar characteristics for each of the participants affiliated with the group.

According to another embodiment of the invention, an apparatus is provided that includes a receiver configured to receive application information for a multi-user application in which users are represented as avatars, where the application information includes at least avatar characteristics. The application information may also include, for example, an application or gaming environment and the associated visual, audio and/or other presentations of the hosted application. A user output is configured to present a set of avatar characteristics from which a user can select to create a respective avatar. A user input is configured to facilitate user designation of a group of users in which to be affiliated. The user output is further configured to present a subset of the set of avatar characteristics that are available for selection by the user in response to becoming affiliated with the group.

According to more particular embodiments of such an apparatus, the user input may be further configured to assist the user in specifying which of the avatar characteristics are to be provided in the subset of avatar characteristics and thus available for selection by all users affiliated with the group. In a more particular embodiment, a transmitter is provided to transmit the specified avatar characteristics to be provided in the subset of avatar characteristics to an application server for distribution to all users affiliated with the group.

Another particular embodiment of such an apparatus further involves the apparatus itself hosting part or all of the application. For example, one embodiment of the apparatus includes a transmitter to transmit the application information to other users of the multi-user application where the apparatus is designated as a host of the multi-user application. Such an embodiment may also include some storage configured to store at least the multi-user application and the set of available avatar characteristics from which the users of the multi-user application can select to create their respective avatars.

These and other aspects of the present application will be apparent from the detailed description below. In no event, however, should the above summaries be construed as limitations on the claimed subject matter, which subject matter is defined by the attached claims, as may be amended during prosecution.

BRIEF DESCRIPTION OF THE DRAWINGS

The invention is described in connection with the appended drawings, wherein like items have like reference numbers, and wherein:

FIGS. 5a and 5b are block diagrams of available avatar characteristics for a given software application at a given point in time, showing how different avatar characteristics can be associated with different avatar categories and with different users as a function of their group affiliation;

DETAILED DESCRIPTION OF ILLUSTRATIVE EMBODIMENTS

Games have become increasingly widespread. Participation in games, shared applications, and other interactive technologies are expanding beyond small numbers of users, and existing manners for creating avatars and other personifications, though convenient for dealing with individuals, are not so convenient for dealing with groups. Current avatar differentiation methodologies, for example, fail to adequately empower groups and their members to control group-related aspects of their avatars and the avatars of other users.

Games or applications may have participants ranging in numbers from a handful to thousands or more. For example, games involving extremely large numbers of players, such as in the case of massively multiplayer online role-playing games (MMORPG) and other role-playing games, may have well over a million subscribers. Where the number of participants involved in a game or other application grows beyond a relatively small number, there is a possibility for participants' avatars to form associations with one another, and/or with other virtual entities involved in the activity. Such associations may be facilitated by the game/application itself, or may be independently formed among the game/application participants.

For example, a number of users may become familiar with each other and may agree to join together into a group known as a clan, guild, team, faction or other association for companionship, adventure, common defense, economic gain, or the like. In some cases, these users may also agree to establish requirements regarding the appearance of avatars for group members. The use of common group avatar characteristics can help to express group identity, and can help all users to more easily distinguish users who are members of the group from users who are not members. Among other things, the present application discloses new manners for facilitating group avatar creation and differentiation, such as providing increased user or participant control in combination with automated features for defining common appearance traits and/or group identity for object or character instantiations associated with a group.

Figure 1:
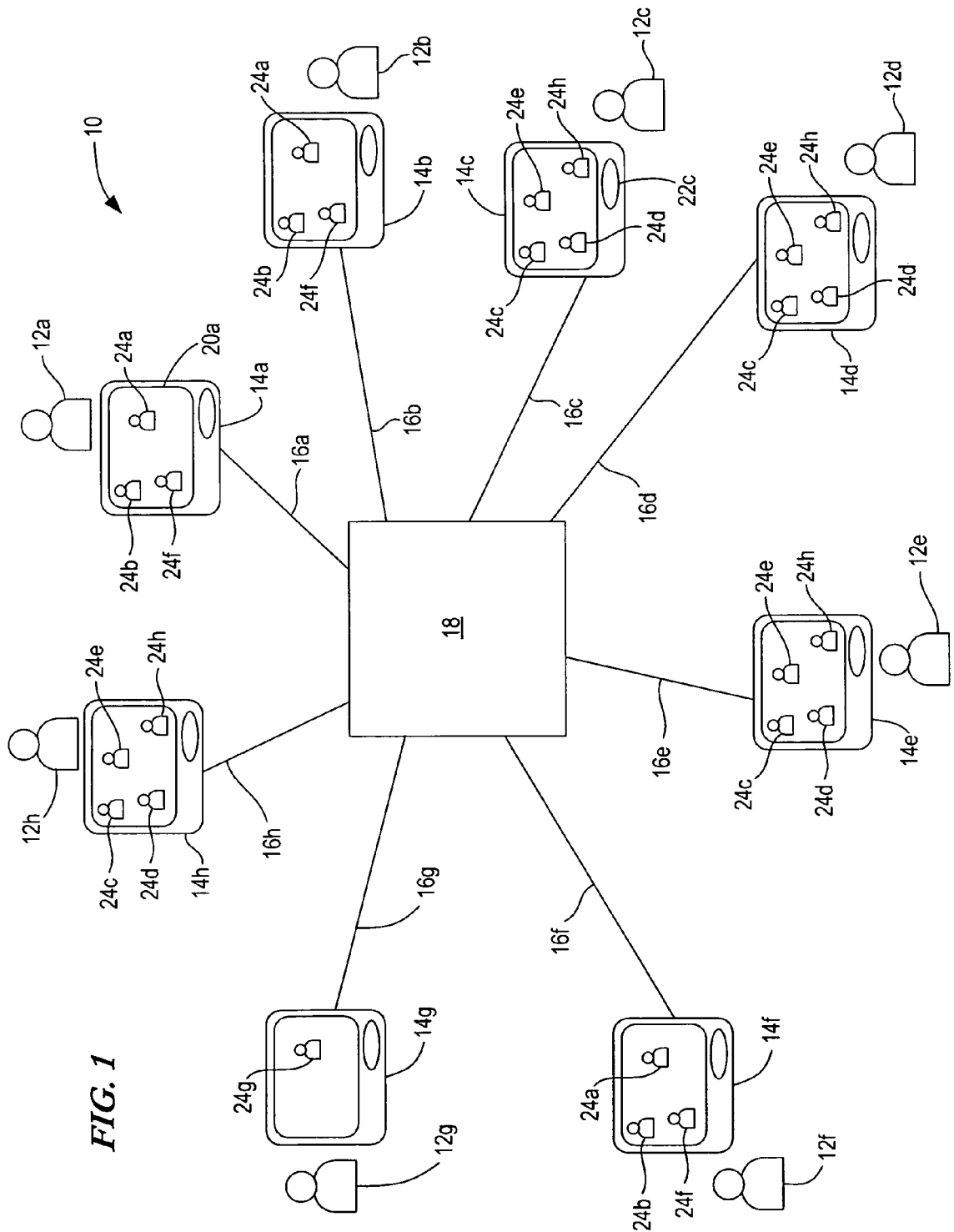
FIG. 1 is a schematic block diagram illustrating a system for providing a software application in which a plurality of users can interact using avatars.

In FIG. 1, we see in schematic block diagram form a system 10 for providing a software application in which a plurality of users 12a-h can interact with each other. A user interaction typically comprises a first user taking an action that influences a second user, e.g., conveying a message, delivering a blow, offering a gift, attacking a foe, and so forth. Such actions, of course, occur within the context of the software application and thus are directed to virtual representations of the users, e.g. to their avatars or other pseudo representations, rather than to the users themselves. Following the action of the first user, the second user may then take an action that is based on or otherwise influenced by the first user's action, e.g., responding to the message, defending the blow, receiving the gift, and so forth. In some cases, taking an action may comprise choosing to refrain from, delay, or otherwise modify an expected action. The software application may be a game, in which each user can advance in rank or points, or it may be a virtual world with no game content.

The users 12a-h have respective access devices 14a-h as shown. These devices communicate via links 16a-h to a central networking device 18 such as a computer server, workstation, gaming unit, or other suitable device. Each device 14a-h may be equipped with an output mechanism such as a pixilated display 20a and/or a speaker 22c with which it can represent to its respective user 12a-h the avatars of other users. In the figure, avatars are represented by the numbered items 24a-h, with avatar 24a corresponding to user 12a, avatar 24b corresponding to user 12b, and so forth. In some cases the networking device 18 may also include one or more displays, speakers, or other output devices. The access devices and the networking device typically are or comprise digital electronic devices, any of which may include suitable processors, memory, networks, and other known components to support the application. The software application may be resident on the access devices, the networking device, or both. The application, which may include or communicate with databases of avatar characteristics and other information, may also reside on any known or later-developed computer-readable storage medium.

A wide range of access devices can be supported, e.g., desktop, laptop, or handheld computers, personal digital assistants (PDAs), mobile phones, and the like. The devices include at least one input mechanism or device such as one or more buttons, keypads, keyboards, touch screens, touch pads, computer mice, trackballs, joysticks, microphones, accelerometers, or the like. The user may manipulate such input device(s) to participate in the networked application, and also preferably to select from various avatar characteristics to the extent permitted by the application. The devices also preferably include at least one output mechanism or device such as one or more direct-view or head-up displays, projectors, speakers, tactile components (e.g. vibrators), or the like. Such output devices preferably provide the user with images, sounds, and/or other information related to their status in the application, and also preferably with such information related to avatars including avatars of other users, their own user-specific avatar, and characteristics thereof.

Even though each of the users 12a-h is participating in the networked software application, the application can be configured such that they need not have the same interaction experiences at the same time. "Interaction experience", in this regard, can refer to an encounter (or lack thereof) with selected other users within the context of the application. For example, at a given time one user may be interacting with none of the other users, while another user may be interacting with many of the other users. In FIG. 1, users 12a, 12b, and 12f are shown interacting with each other while users 12c, 12d, 12e, and 12h are interacting with each other, and user 12g is not interacting with any other user. In connection with the various interactions, each access device notifies its respective user of the other users with whom they are interacting (if any) via such other users' avatars, as indicated.

In another configuration, and where the number of users is relatively small, the software application may be configured such that all of the users have the same interaction experiences at the same time. That is, each user is aware of and can interact with all the other users engaged in the application.

The software application may be configured to allow one or more existing users to exit the application when they so desire, and to allow one or more new users to join while existing users are engaged in the application. Thus, the number and identity of the users engaged in the software application may change and evolve over time as existing users leave and new users join. In a similar fashion, the number and identity of users who are associated with a particular group may, in some embodiments, be allowed to change and evolve over time.

Other known networking architectures can be used instead of or in addition to the central networking architecture shown in FIG. 1. Such architectures may comprise LANs, GANs (such as the internet), and/or any other suitable network that is now know or later developed. Device 18 may be a single stand-along device or it may comprise multiple computing devices networked together. Further, the hosting functions of device 18 need not be performed by a separate computing device(s), but rather may be performed by any one or more of the participating devices 14a-h. In other words, in addition to or in lieu of a device(s) 18 hosting the application or game, any device 14a-h may serve as the application or game server, or any collection of the devices 14a-h may serve as a distributed application/game server. With respect to links 16a-h, any or all of them may be wired, and any or all of them may be wireless, as desired.

Figure 2:
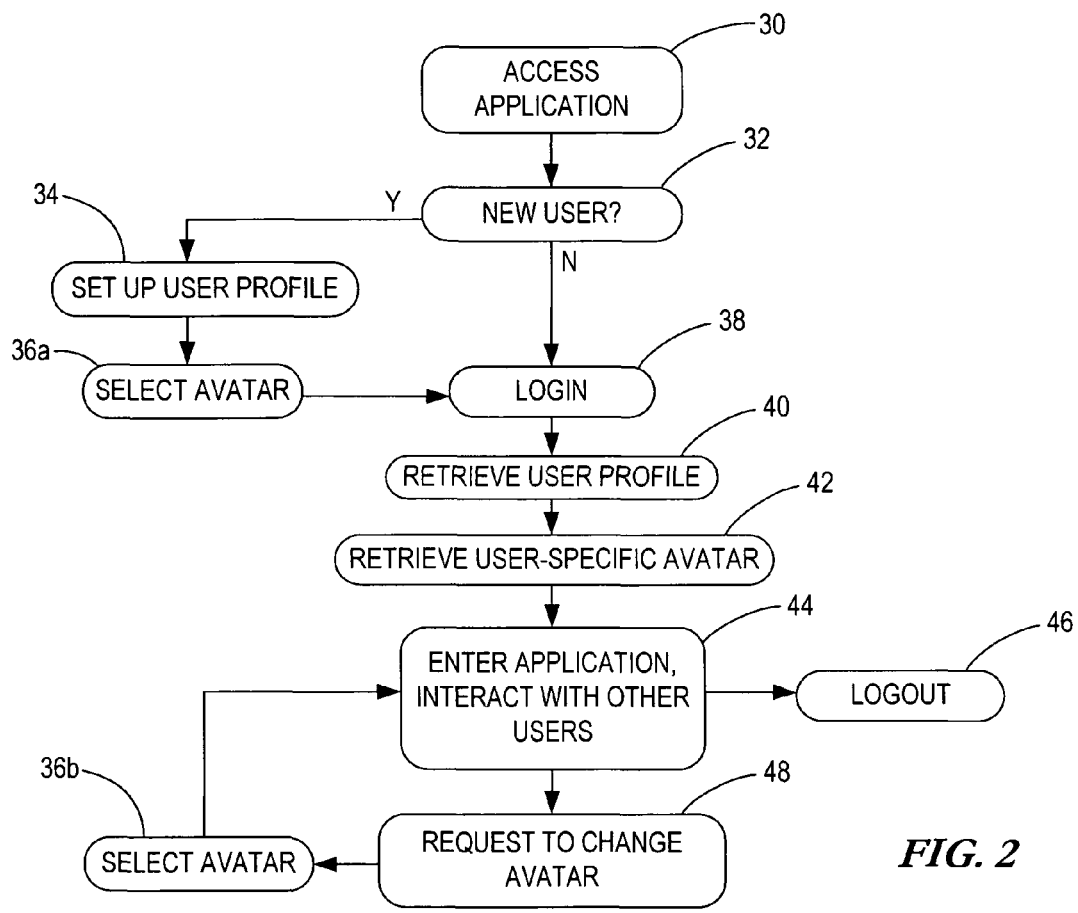
FIG. 2 is a schematic flow diagram illustrating one way that a user may access the software application and become associated with a particular avatar.

FIG. 2 is a schematic flow diagram illustrating one way that a user may access the application and become associated with a particular avatar. In step 30, the user accesses the application, such as by running an executable version of the application on their access device and contacting the central networking device. In step 32, the application then determines whether the user is a new user.

If the user is new, operation proceeds to a step 34 in which the user enters information to set up a user profile, e.g., creating a new account name and password, making payment arrangements, and/or entering other desired information. Operation then proceeds to step 36a, where the user can make selections from available avatar characteristics to create a user-specific avatar. This avatar, unless and until it is later modified, can be used thereafter to represent the user to other users. The avatar can thus become an important part of the user's identity or persona in the context of the software application. Although step 36a is shown separately from step 34, the two may be combined into a single setup/selection operation. The application stores information received in steps 34 and 36a in a memory device for future retrieval. After the new user has completed steps 34 and 36a, operation proceeds to login step 38.

At step 38, the new user (via steps 34 and 36a) or an existing user (directly via step 32) logs in to the application, e.g. by entering a username and password, or by transmitting another suitable code by which the application can identify the user. Upon successful completion of this step, the application retrieves from memory user profile information associated with the user at step 40, and user-specific avatar information associated with the user at step 42. Again, although shown separately, these may be combined into a single retrieval step. Operation proceeds to step 44, whereupon the user enters the application, interacting with features of the application such as virtual beings, places, and/or things, and with other users as appropriate. At some later time, the user may logout and exit the application at step 46. Prior to logging out, as explained further below, the user may generate a request to change their user-specific avatar, or indeed any other aspect of their user profile, at step 48. Upon acceptance of such a request, operation proceeds to step 36b, where the user is presented with available avatar characteristics and is able to select from such characteristics to create a modified user-specific avatar. Operation proceeds back to step 44, wherein the user is now presented to other users with the modified user-specific avatar.

In the foregoing description the user-specific avatar is also user-selected, since it is the user himself or herself who selects the desired avatar characteristics at steps 36a, 36b from available avatar characteristics. However, in alternative embodiments the software application may automatically select avatar characteristics at steps 36a, 36b from available avatar characteristics, without any selection or with limited selection from the user. Thus, the user-specific avatar may in some cases be user-selected, and in other cases be automatically selected by the application itself.

Note also that by use of the term "user-specific avatar", we do not necessarily mean that the avatar associated with one user is unique and different from those of all other users. For example, two users may happen to select identical sets of avatar characteristics, in which case the user-specific avatars of those users will be identical. Alternatively, the software may be configured to prohibit this possibility so that the avatar of each user is unique with respect to, for example, all other users, or all other users that have logged in to the application in the past 30 days or other specified time period, or all other users that are currently engaged in the application.

In any event it is preferred that the number of available avatar characteristics is large enough with respect to the number of users that a wide variety of user-specific avatars can be collectively used by the users, and that the occurrence of the same avatar for different users is relatively rare.

Figure 3:
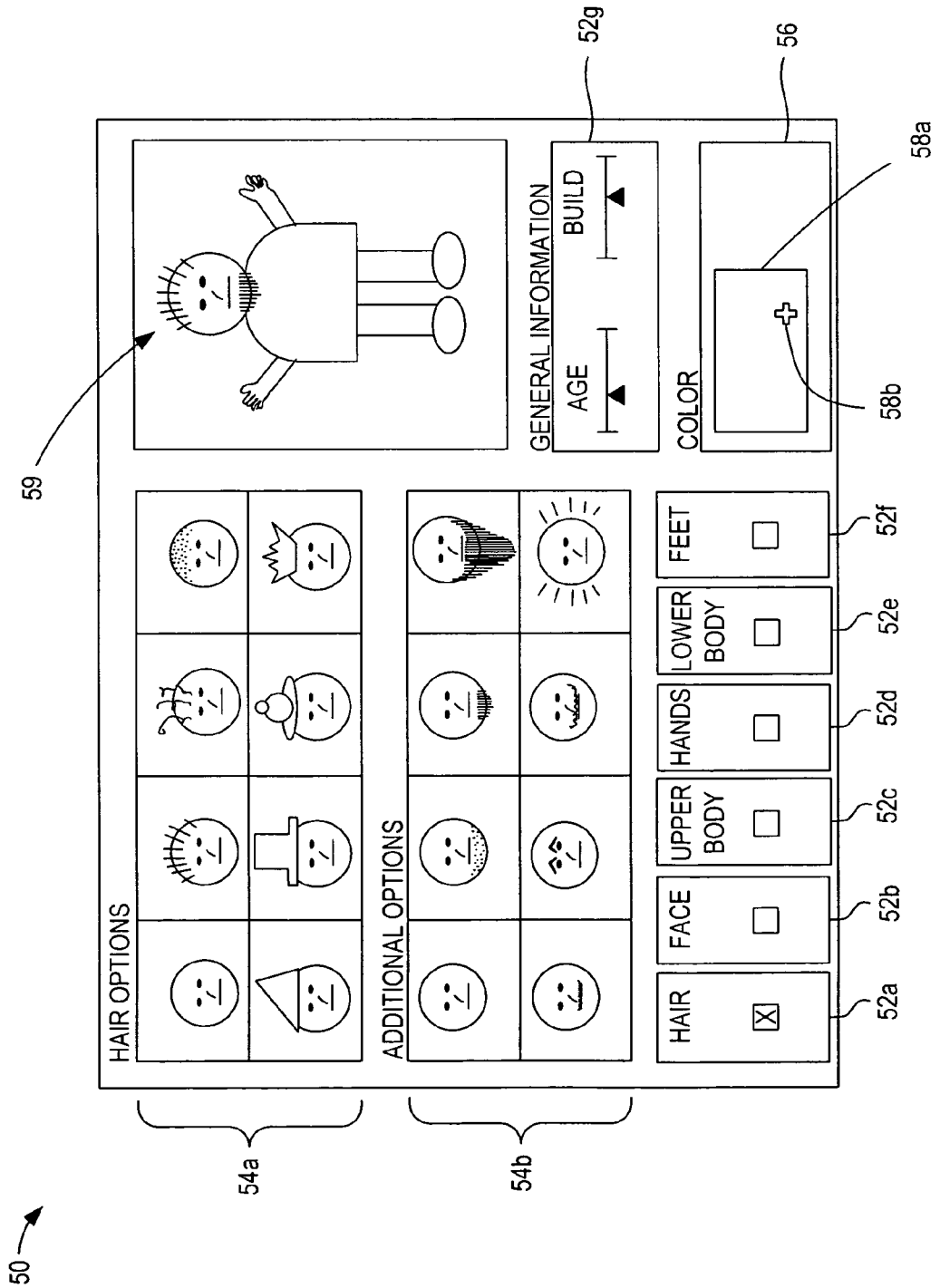
FIG. 3 is a representation of a user interface configured to allow a user to select avatar characteristics from available avatar characteristics to help create a user-specific avatar.

FIG. 3 depicts an exemplary user interface 50 with which a user may select from available avatar characteristics such as in steps 36a and 36b. This user interface may be displayed on access devices such as devices 14a-h, for example, and users may make their selections using input devices provided by the access devices. In this case, the avatar characteristics are arranged into seven categories-hair, face, upper body, hands, lower body, feet, and general information-corresponding to panels 52a-g respectively. In the figure, the hair category (panel 52a) has been selected. The general information panel 52g includes a first adjustable slider with which one can select the avatar characteristic "age", and a second adjustable slider with which one can select the avatar characteristic "build". The user interface 50 includes another panel 54a that provides an array of discrete choices or options with respect to the selected category, and an additional panel 54b that provides additional options, in this case, options for facial hair and the like. Finally, a color selection panel 56 is provided with a color grid 58a and a selection icon 58b. With the hair category (panel 52a) selected, the color grid 58a can be labeled "hair tint", and moving the selection icon 58b within the area of the color grid (e.g. using a computer mouse, touchpad, or other suitable input device) provides a selection of the hair color or tint of the avatar. By selecting other avatar categories, the color grid 58a can be relabeled and used to specify the color of other avatar components, such as the items of clothing for the avatar. Of course, as the user selects other avatar categories, such as panels 52b-f, the discrete options depicted in panels 54a and 54b are replaced with other discrete options associated with the then-selected category. Selecting the lower body (panel 52e) category, for example, can cause various kinds of trouser and/or skirt options to appear in panels 54a, 54b. Through such selections, the user interface 50 allows the user to choose from all of the available avatar characteristics in order to define or create the user-specific avatar 59, which is the synthesis or compilation of all such selections.

The user interface 50 may if desired also have associated with it a set of avatar relationship rules that prohibit or require certain combinations of avatar characteristics. For example, if eye color and hair color are categories of avatar characteristics and the user selects "blue" for eye color, the relationship rules may require (and cause the application to automatically select) the hair color to be "blonde" and not other options. Similarly, if gender and facial hair are avatar characteristics and the user selects "female", the relationship rules may prohibit (and cause the application to automatically deselect) all bearded facial hair options. Thus, as the user selects from all the available avatar characteristics, any avatar relationship rules, if present, will place limitations on the combinations of avatar characteristics that may be selected.

The avatar 59 of FIG. 3 includes a 2-dimensional graphic depiction of a living being, in this case a human-like character, but the reader should understand that many other types of avatars are also contemplated, such as pseudo 3-dimensional or true 3-dimensional graphic depictions. (Pseudo 3-dimensional, in this regard, refers to an image that lies in a plane but that uses shading, perspective, or similar drawing techniques to convey a sense of depth to the viewer. Electronic display devices and accessories for displaying true 3-dimensional images are also known, and can if desired be included in the access devices 14a-h to display the avatars.) An avatar may alternatively be or include a graphic depiction of a non-human living being, such as a real-life animal (whether now living or extinct, such as dinosaurs) or a fantasy animal such as a unicorn, or other fantasy being such as an elf, zombie, alien, centaur, or the like. An avatar may alternatively be or include a graphic depiction of a non-living thing, such as one or more devices, machines, shapes/symbols, or any other inanimate objects. An avatar may include, for example, alphanumeric characters such as are used in nicknames. An avatar may also include audio characteristics, i.e., sounds. For the benefit of some users, e.g., blind users, the access device may present the avatars of other users only audibly (e.g. as a verbal description of the avatar) and not graphically or visually, or both audibly and visually. Further, as olfactory (smell) technology advances, and electronic smell emission devices become practical for use with digital electronic systems, the avatar may comprise smell-related characteristics.

Technically, the avatar may be stored on a digital electronic system as one or more data files. For example, the avatar may comprise a primary 2- or 3-dimensional data file representing a base or unadorned character, and secondary texture data files representing character parts or accessories. The software application applies the texture data files to the primary data file to produce a perceptible (visual and/or audio) instantiation of the avatar.

Figure 4:
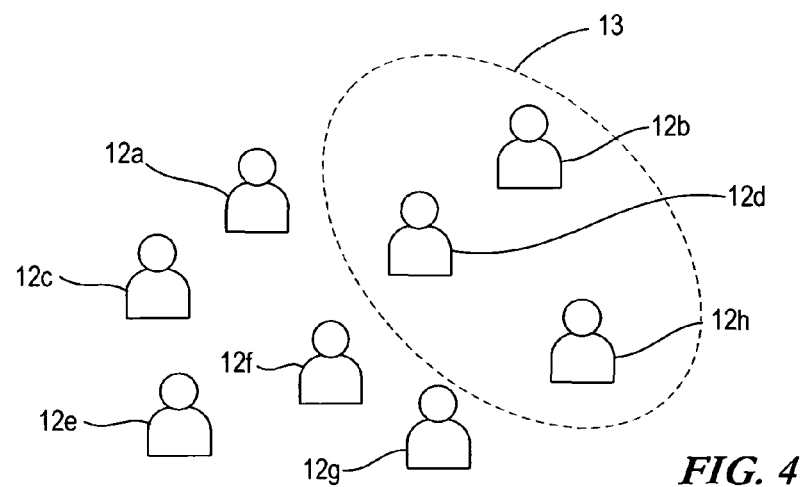
FIG. 4 is a schematic representation of a plurality of users, wherein some of the users are associated with a group and others are not.

With the foregoing preliminary discussion, we are now ready to discuss the situation in which a number of users are permitted to band together to form a guild, clan, team, faction or other association of users or participants, generally referred to herein as a group. FIG. 4 is a schematic representation of the plurality of users 12a-h from FIG. 1. Some of the users, 12b, 12d, and 12h, have been designated to belong to a group 13. The other users are not designated as belonging to the group 13.

The group designation may arise in various ways. It may arise in voluntary or involuntary ways. It may be applied to existing users with existing user-specific avatars (which may or may not require modification for compatibility with group avatar requirements), and/or to new users who have not yet selected an avatar. These different situations have different ramifications for the use of group avatar characteristics.

As an example of a voluntary approach, the users 12b, 12d, 12h may begin using the software application as regular users with their own user-specific avatars, without being part of group 13 or any other group. Over time, after numerous interactions, these users become familiar with each other and develop positive attitudes towards each other. They communicate with each other and they all agree to form a group. The software application may accomplish this by, for example, establishing the group 13 and adding a group designation for group 13 to the user profiles of the founding members of the group, i.e., of users 12b, 12d, 12h. The founding members may also agree on a group name, a charter or purpose of the group, and/or on one or more obligations that will be required of all group members. For example, the group purpose may be for mutual defense, and members may be obliged to assist or defend (within the context of the software application) other group members if attacked. Alternatively, the group purpose may be for economic security, and group members may be obliged to give a specified portion of any of their virtual earnings to other group members, or to otherwise assist other group members in financial need (within the context of the software application). Thus, the group obligation(s) may have no relationship to members' avatars.

As an example of an involuntary approach, the group designation may arise by automatic or semi-automatic selection by the software application. In automatic selection, the software application initiates a search of existing users in response to a triggering mechanism. The application then selects some of the users (e.g. randomly, or non-randomly based on user characteristics or information), in this case, users 12b, 12d, and 12h, and designates them as members of the group 13, with or without their consent. In semi-automatic selection, one or more users may generate a request that becomes the triggering mechanism, or may be involved in selecting which users are to be included in or excluded from the group. Again, the application may accomplish the group formation by, for example, adding a designation for group 13 to the user profiles of the founding members of the group, i.e., of users 12b, 12d, 12h. The application may also impose a group name, group purpose(s), and group obligation(s) as discussed above, and/or invited or drafted users may agree on these things.

Other ways in which the group designation may arise is by one or more users, and/or the software application automatically or semi-automatically, defining a group, whether by group name, group purpose(s), and/or group obligation(s), and offering or imposing group membership to new users during setup steps 34, 36a. Preferably, such users are notified of membership in the group or invited thereto before avatar selection step 36a, so that they can take advantage of the automated selection techniques described herein and avoid the need to change their avatar in the event they select one not compatible with avatar characteristics associated with the group, i.e., group avatar characteristics.

Whichever way the group designation arises, users that are not founding members of the group may be permitted to voluntarily join the group, and founding members may or may not be permitted to leave the group. The software application may impose restrictions on these activities. For example, unanimous or majority approval of one, some, or all existing members of the group may be required. In some cases, the software application may on its own (sua sponte) require one or more users who are members of the group to leave the group, or require one or more users who are not members of the group to join the group.

At some point in time, whether at the time the group is defined and formed, or at some later time after some users have joined the group and others have left the group, one or more group avatar characteristics are defined in order to, for example, promote group identity as mentioned above. In order to promote increased user or group control, this definition, i.e., associating a selected set of the available avatar characteristics with the group, is preferably carried out via an instruction from one or more of the users associated with the group. The instruction may be or include, for example, a listing of certain ones of the available avatar characteristics that have been selected by such user(s). The instruction may also or alternatively be or include a command or trigger initiated by such user(s) that causes the software application to generate such a listing. The instruction may also be or include a combination of the foregoing in which the user(s) trigger the software application to generate a listing of candidate avatar characteristics, and then the user(s) select which of the candidate characteristics to adopt for their group avatar characteristics. Selection by the users may come about by mutual agreement of users who are members of the group, e.g. the founding members. Thus, in some cases group members may vote on which of the available avatar characteristics to adopt as their group avatar characteristics, and specify them to the application via an instruction. Alternatively, the group avatar characteristics may come about by an instruction-triggered automatic selection of the software application, or a combination of automatic selection and selection by group members as mentioned above. Preferably, the instruction from the user(s) and the selections by the user(s) are carried out via one or more input devices provided on the users' access devices 14, discussed further below.

In some cases, the group avatar characteristics are selected from all of the currently available avatar characteristics. FIG. 5a is a simplified block diagram of all available avatar characteristics 60 for a given software application at a given point in time. The avatar characteristics are individually labeled with an "X" and/or a circle for simplicity, and collectively labeled 60. In general, users who are not members of any group, and who specify their avatar at login (see step 36a of FIG. 2) or change or create their avatar at a later time (see step 36b of FIG. 2), have access to all of the characteristics 60 during avatar selection. The characteristics 60 are grouped into avatar categories of Gender, Age, Hair, Clothing, Accessories, Colors, Movement/animation, Sounds, and Rules, most of which need no further explanation in view of the foregoing discussion. Of course, more, less, or different categories can be used as desired depending on the nature of the avatars used and system complexity. Exemplary categories include gender, age, eye color, height, width, haircut and color, facial features (e.g. facial hair), hands (such as size, number of fingers, etc.), build of upper body (e.g. chest), build of lower body, build of legs, clothing (or lack thereof) associated with each body part, and ornaments (or lack thereof) associated with each body part, e.g., jewelry and tattoos.

In the Colors category of FIG. 5a, the Xs may correspond to selectable coordinates on a color grid such as color grid 58a. In this regard, multiple Colors categories may be provided to correspond to other avatar categories, e.g., one Colors category may correspond to Hair, controlling the color of the selected hair characteristic(s), and another Colors category may correspond to clothing, controlling the color of the selected clothing characteristic(s). The Movement/animation category of FIG. 5a contains characteristics relating to the apparent motion of avatars that are visual or graphic in nature. Some such characteristics may cause the displayed avatar, or portions thereof, to appear to spin, jump, walk, run, or shake, for example. Other such characteristics may cause the avatar or portions thereof to blink on and off, fade in and out, or glow. Another such characteristic may cause the avatar to remain motionless and constant. A further example is a specialized guild greeting animation. The Sounds category of FIG. 5a contains characteristics relating to sounds associated with avatars having audio features. Such characteristics may include voice type, voice pitch, language used, music, and noises such as chimes, beeps, grunts, moans, or the like, for example. A specialized guild war cry is a further example. The Rules category of FIG. 5a contains characteristics that limit permissible combinations of other characteristics, such as requiring blonde hair if blue eyes are selected, or prohibiting bearded hair characteristics if a female gender is selected, as mentioned above. Such rules may be in the form of IF-THEN-NOT clauses, and may prohibit certain clothing and color combinations. For example, a user who selects blue trousers may be prohibited from selecting a yellow shirt.

The group avatar characteristics, whether selected by one or more of the users or by the software application or a combination thereof, can be a subset of the available avatar characteristics 60. In FIG. 5a, a subset of the characteristics 60 are shown with a circle drawn around them. These circled characteristics may, for example, be the only ones of characteristics 60 that are available to members of the group, i.e., they may define the group avatar characteristics. Beyond restricting group members to the more limited set of avatar options, one or more of the circled characteristics may be not only an option but a requirement for the group members. For example, all group members may be required to have avatars with a certain hair characteristic (such as a particular haircut) and with a certain article of clothing (such as a particular robe). In another example, group avatars may be required to be male with short blonde hair, blue eyes, 20-30 years of age, tall and thin built, with black leather trousers and boots. All other avatar characteristics can be freely chosen, except that a characteristic corresponding to a pink shirt is prohibited. In still another example, all avatar characteristics except for color characteristics can be freely chosen by group members. The color characteristics available to group members may be restricted for body features or clothing. For example, color characteristics for articles of clothing may be limited to specified shades of black and red. Group members may then select from all available clothing characteristics for their respective avatars, but such clothing is restricted to colors within the specified shades.

The group avatar characteristics may have a global scope (i.e., be applicable at all times and in all circumstances) or a scope that is limited in time or according to circumstance or otherwise. For example, the group avatar characteristics may be required only during virtual daytime and not during virtual nighttime. In such a case, group members may be permitted or required to change their user-specific avatars from group-compatible avatars to conventional (non-group member) avatars during virtual nighttime. As another example, group members may be permitted or required to comply with the group avatar characteristics only when attending a virtual event sponsored by the group, and may be permitted or required to comply with non-group avatar characteristics otherwise, e.g., for a private meeting in the virtual world generated by the software application.

The situation described in connection with FIG. 5a is helpful towards the goal of achieving a common group identity, since it limits the range of avatar options available to group members and imposes a greater avatar uniformity within the group. However, as described above, the (limited) options available to group members are also available to non-group members, since the group avatar characteristics are a subset of the available avatar characteristics and the available avatar characteristics are all accessible by non-members. Thus, one or more non-member may have a user-specific avatar that is in all respects compatible and consistent with the group avatar characteristics. Such avatar may thus be mistaken by other users to be that of a group member. To avoid this situation, the database of available avatar characteristics may be organized such that at least one avatar characteristic is included in the group avatar characteristics, and is thus available to group members, but is not available to users who are not group members. In this regard, the database of available avatar characteristics may be arranged into different first and second sets of avatar characteristics. In creating or modifying their avatars, users who are group members are restricted to the first set, and users who are not group members are restricted to the second set. The situation described in connection with FIG. 5a is a case where the first set is a subset of the second set. Other scenarios are also contemplated, e.g., wherein the second set is a subset of the first set, wherein each set includes one or more characteristics not included in the other set and one or more characteristics included in the other set, and wherein the sets are non-overlapping, i.e., wherein each set contains only avatar characteristics that are not included in the other set. In some cases the entire database of available avatar characteristics may be the first set, in which case group members can select from all available avatar characteristics but non-group members can select from only a subset of the available avatar characteristics, i.e., from the second set. In other cases the entire database of available avatar characteristics may be the second set, in which case non-group members can select from all available avatar characteristics but group members can select from only a subset of the available avatar characteristics, i.e., from the first set.

FIG. 5b depicts a scenario in which at least one available avatar characteristic is included in the first set but not the second set. In FIG. 5b, the same available avatar characteristics 60 are available as in FIG. 5a, but the availability of those characteristics to group members and non-group members is different. Circles and Xs are again used to indicate availability of each avatar characteristic to group members and non-group members respectively. Group members are restricted to characteristics marked with a circle (collectively the first set), and non-group members are restricted to characteristics marked with an X (collectively the second set). As shown, avatar characteristic 62, in the Accessories category, and avatar characteristic 64, in the Clothing category, are accessible to group members but not to non-group members. A user encountering another user whose avatar includes the avatar feature 64, e.g. a stylized robe, may thus immediately recognize the other user as belonging to the group. The ability to distinguish members from non-members via their avatars is further strengthened if at least one of the avatar features available only to group members is made mandatory for group members.

In addition to restricting available avatar characteristics to users as a function of their association or non-association with the group, the software application preferably facilitates avatar creation and modification by presenting to the user via a graphical user interface, template, checklist, menu (e.g. pull-down or drop-down), or other convenient technique only those avatar characteristics associated with such user's status as a member or non-member of the group. For example, the software may present a menu similar to the block diagrams of FIG. 5a or 5b to a user wishing to create or modify such user's avatar, but wherein such menu limits selections to only the first set of characteristics (those marked with a circle) for group members, and limits selections to only the second set of characteristics (those marked with an X) for non-group members. Avatar characteristics not available to the user may be completely absent from the menu or may be grayed-out or otherwise indicated to be inactive.

Figure 6:
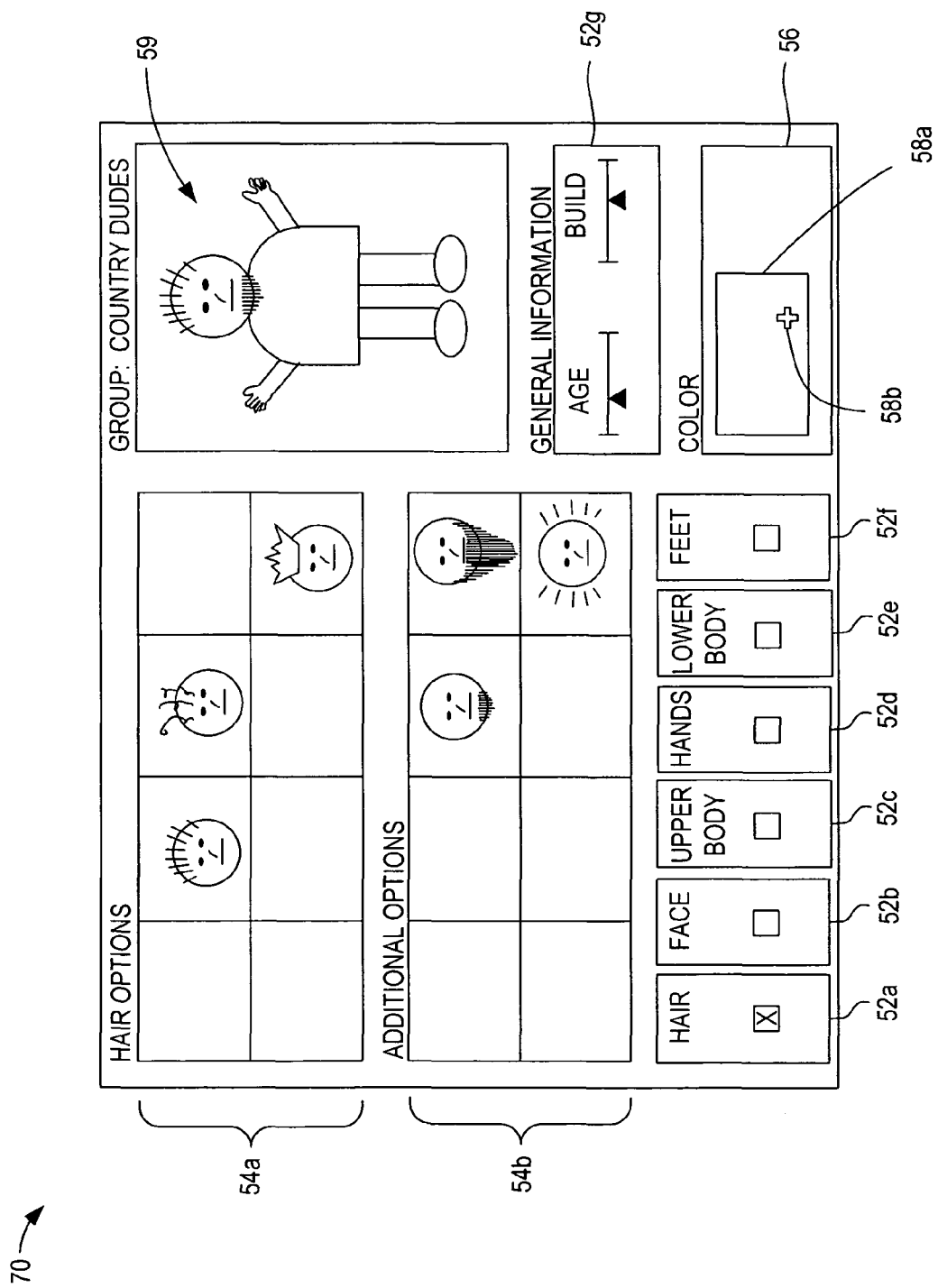
FIG. 6 is a representation of a user interface that restricts avatar characteristics presented to the user based on the user's group affiliation.

In FIG. 6, a user interface 70 similar to user interface 50 of FIG. 3 is provided to a user who is a member of a group named "Country Dudes". For brevity of description, element labeling is used consistently with that of FIG. 3. User interface 50 may represent a user interface presented user who is not a member of the Country Dudes group. User interface 50 presents only avatar characteristics selected from the second set of avatar characteristics (those available to non-group members), and user 70 presents only avatar characteristics selected from the first set of avatar characteristics (those available to group members). As shown in the figures, the second set contains sixteen different avatar characteristics (FIG. 3, panels 54a and 54b) in the Hair category, but the first set contains only six of these characteristics. Ten of the Hair-category avatar characteristics available to non-group members are therefore not available to group members, and are conveniently not presented to them by the user interface. This automated feature helps to facilitate the use of group avatars within the software application.

Figure 7:
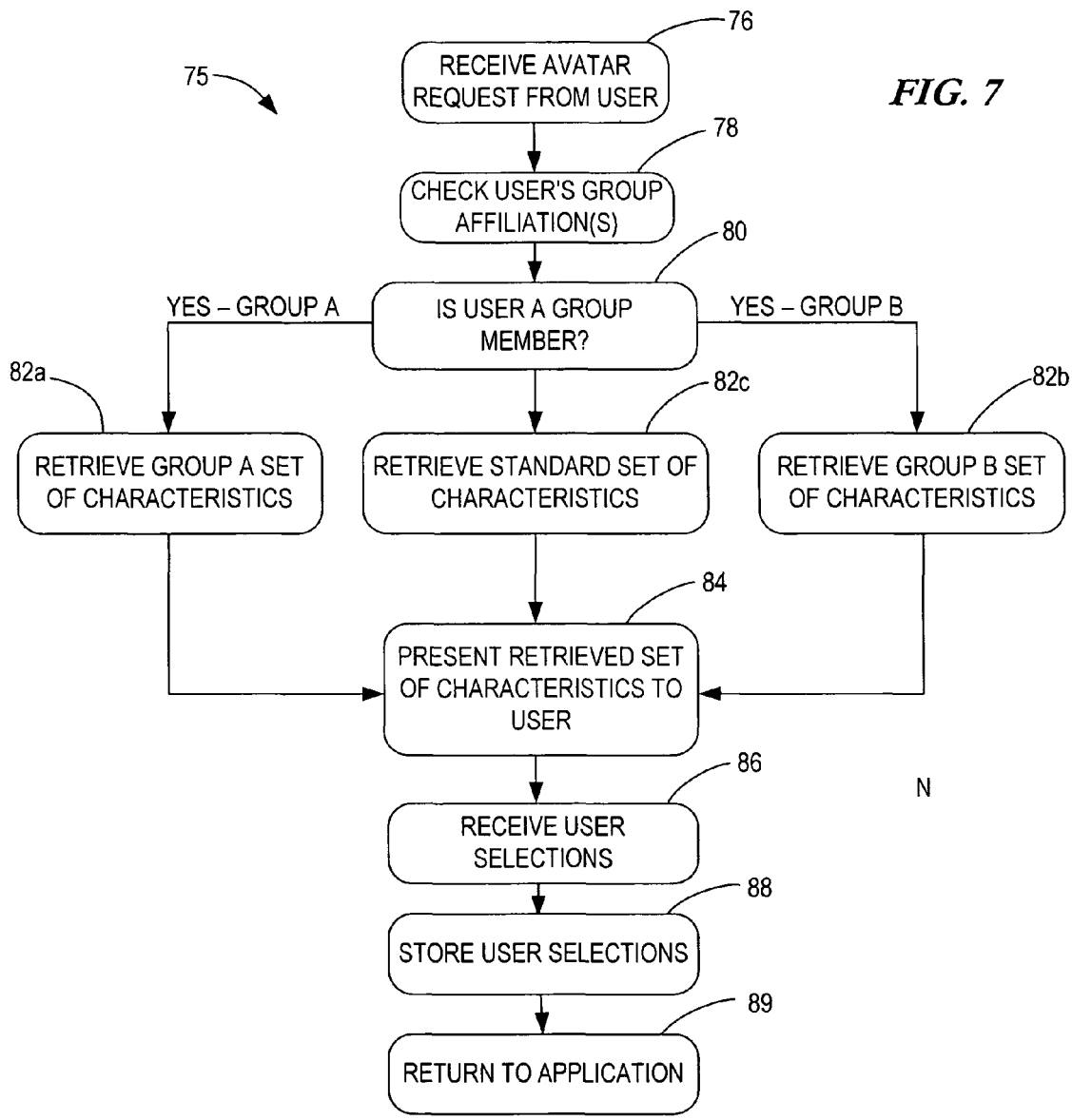
FIG. 7 is a flow diagram of a process for presenting selected sets of avatar characteristics to the user based on user group affiliation(s)

A related flow diagram of a process 75 for presenting selected sets of avatar characteristics based on user group affiliation(s) is shown in FIG. 7. In step 76, the application receives a request from a user to create or modify a user-specific avatar. In step 78, the application determines whether the user is affiliated with any group, e.g., by checking the user's profile or submitting a query. Step 80 directs operation to step 82a, 82b, or 82c if the user is a member of a predefined Group A, a predefined Group B, or has no group affiliation, respectively. In steps 82a and 82b, the application retrieves predefined sets (A and B, respectively) of the available avatar characteristics. In step 82c, the application retrieves a standard set of the available avatar characteristics. The Group A, Group B, and standard set of avatar characteristics are different from each other. In step 84, the application presents the retrieved set of avatar characteristics to the user, e.g. using a user interface similar to FIGS. 3 and 6 or a menu similar to FIGS. 5a and 5b. After receiving the user's selections (step 86), the application stores those selections (step 88) and returns the user to the application (step 89).

Only groups A and B are referred to in FIG. 7 for simplicity, but the reader will understand that a multitude of different groups may also be supported by the software application, and the groups can have a wide variety of relationships with respect to each other. For example, some groups may be mutually exclusive, having no users in common, and/or having group objectives or obligations that are opposed to each other. Some groups may be overlapping, having some users in common but not others, and/or having group objectives or obligations that can overlap. Some groups may have a set/subset relationship, wherein all users in a first group are also in a second group but only some of the users in the second group are in the first group, or vice versa. An example of the latter circumstance may be where one group is formed and then other sub-groups, e.g., hierarchical classes such as committees, councils, leaders, officers, long-time members (e.g. founding members) versus newer members, or other status-related sub-groups may be formed within the original group. In such a case, officers or long-time members, for example, may be given access to different body appearances and outfits (in the creation or modification of their user-specific avatars) than newer members.

Besides automating the presentation and selection of group-based avatar, the software application can also automate the manner in which group avatar characteristics are generated. As mentioned above, such group characteristics may be arrived at through communication and agreement among users, e.g., where group members vote on characteristics and specify them to the application in the form of an instruction. Alternatively, the application can respond to a member-initiated instruction by automatically generating such group characteristics based on an analysis of existing user-specific avatars.

For example, in connection with FIGS. 1 and 4, users 12b, 12d, and 12h may set up a group definition, affiliate themselves with the group, and instruct the application to generate group avatar characteristics for the group. In some embodiments, the application may analyze the existing avatars of the group members, i.e., users 12b, 12d, and 12h, or users otherwise affiliated with the group (e.g. users wishing to become members of the group), looking for the same or similar avatar characteristics among the users. To the extent the analysis reveals avatar characteristics that match or substantially match each other for all or at least some of the group members, those matching avatar characteristics can be used to define the avatar characteristics for the group. This approach seeks to avoid or minimize incompatibilities between the members' existing avatars and the final group avatar characteristics.

In some embodiments, the application may analyze the avatars of users who are not group members, e.g., all users who are not members of the group. In connection with FIGS. 1 and 4, the application may analyze the existing avatars of non-group members 12a, 12c, 12e, 12f, and 12g, or users otherwise not affiliated with the group (e.g. users who have neither joined the group nor expressed any intention to join the group), looking for one or more available avatar characteristics that are not being used by any non-group members, or that are being used by relatively few of the non-group members. To the extent the analysis reveals avatar characteristics being used by none or relatively few of the non-group members, such unused or seldom-used avatar characteristics can be used to define the avatar characteristics for the group. If such characteristics are adopted by the group, the application may thereafter designate them as being available to group members and not to non-group members. This approach seeks to promote or maximize differentiation between group members and non-group members.

In some embodiments, the application may utilize a hybrid approach, e.g. a combination of the approaches described above, in which it analyzes the avatars both of group members and non-group members and selects group avatar characteristics based on the analysis.

Figure 8:
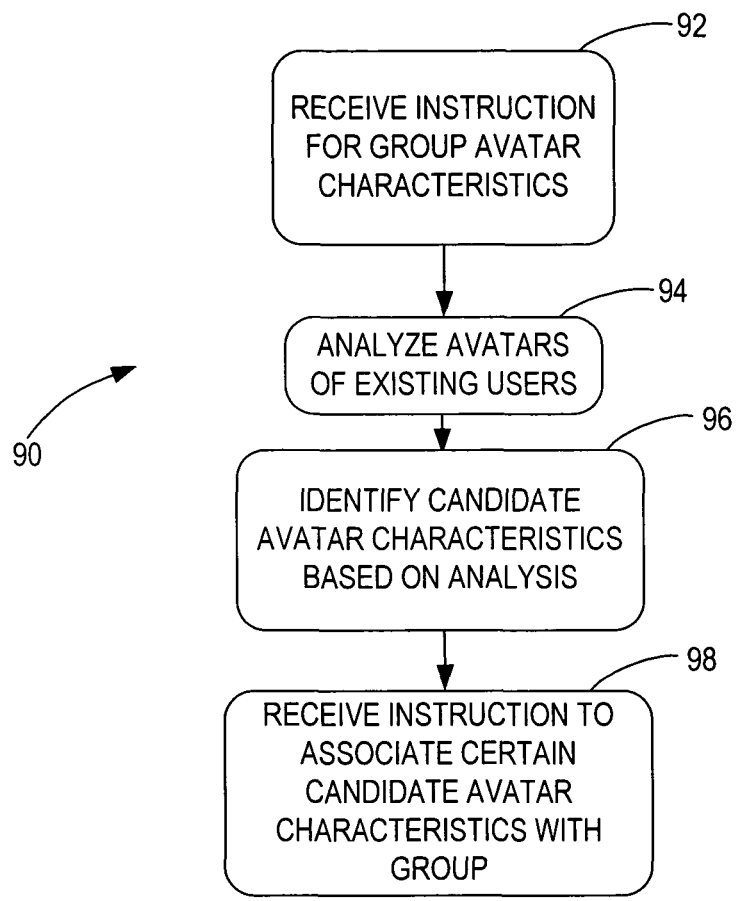
FIG. 8 is a flow diagram of an automated process for generating group avatar characteristics.

FIG. 8 shows a flow diagram of an automated process 90 for generating group avatar characteristics. In step 92, the software application receives an instruction or request from one or more users, typically at least one of the group members (including prospective group members), for group avatar characteristics. In step 94, the application analyzes avatars of existing users, whether group members, non-group members, or both as discussed above. In step 96, the application identifies a set of candidate avatar characteristic(s) from the set of available avatar characteristics based on the analysis. In some cases the application may automatically associate this set of candidate avatar characteristics with the group. In other cases a further step 98 may be employed, wherein the application receives a further instruction from, e.g., one or more of the group members (including prospective group members) in which certain ones of the set of candidate avatar characteristics, selected by the group member(s), are associated with the group.

Many variations of the foregoing techniques will be apparent to the reader. For example, groups may be formed on the basis of the age of the user. The software application may be programmed so as to prohibit the creation of avatars having age-inappropriate characteristics. Users who are under a specified age such as 12 or 18 years, for example, could be compelled to have their avatars wear appropriate outerwear and avoid provocative body forms and provocative clothing.

Furthermore, the application may permit users to create their user-specific avatars freely, but when they submit a request to join a group that has defined group avatar characteristics, the application compares the user's existing avatar to the group avatar characteristics. On the basis of this comparison, the application can provide to the user an indication of compatibility or incompatibility, and if the latter, then also the degree of incompatibility such as a percentage of how much the user's avatar differs from or matches the group characteristics. The application may also in such case identify aspects of the user's avatar that require modification in order to be compatible with the group avatar characteristics.

Figure 9:
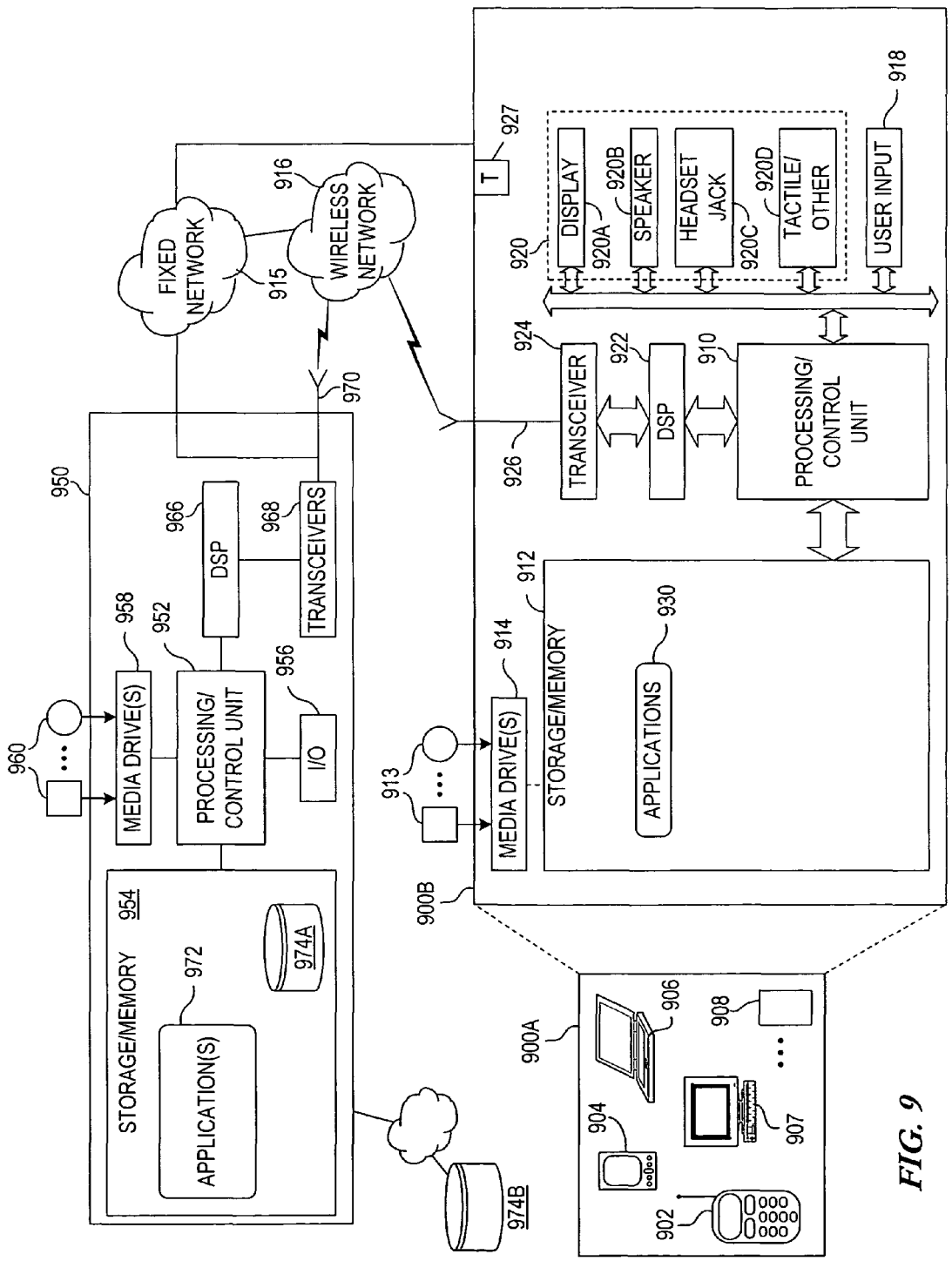
FIG. 9 illustrates representative device and server systems in which the present invention may be implemented.

FIG. 9 illustrates representative device and server systems in which the present invention may be implemented. For example, the device 900A/900B may represent a user device (access device), and device 950 may represent a server or other stand-alone or distributed computing system capable of hosting part or all of the game or application that is executed on each user device 900A/900B.

The device 900A/900B represents any device capable of executing the game or application. The device 900A/900B may be a mobile device capable of communicating over-the-air (OTA) with wireless networks and/or wired networks, or may be a generally non-mobile device coupled to a network (s) via wire. By way of example and not of limitation, the device 900A/900B includes mobile phones or smart phones 902, personal digital assistants 904, portable computing devices 906, stationary computing devices 907 such as workstations or desktops, and other networked terminals 908.

The representative terminal 900A/900B utilizes computing/processing systems to control and manage the conventional device activity as well as the device functionality provided by the present invention. For example, the representative terminal 900B includes a processing/control unit 910, such as a microprocessor, controller, reduced instruction set computer (RISC), or other central processing module. The processing unit 910 need not be a single device, and may include one or more processors. For example, the processing unit may include a master processor and one or more associated slave processors coupled to communicate with the master processor.

The processing unit 910 controls the basic functions of the device 900B as dictated by programs available in the program storage/memory 912. The storage/memory 912 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the terminal. The storage 912 may also include one or more of other types of read-only memory (ROM) and programmable and/or erasable ROM, random access memory (RAM), subscriber interface module (SIM), wireless interface module (WIM), smart card, or other fixed or removable memory device/media. The programs may also be provided via other media 913, such as disks, CD-ROM, DVD, or the like, which are read by the appropriate interfaces and/or media drive(s) 914. The relevant software for carrying out terminal operations in accordance with the present invention may also be transmitted to the device 900B via data signals, such as being downloaded electronically via one or more networks, such as the data network 915 or other data networks, and perhaps an intermediate wireless network(s) 916 in the case where the device 900A/900B is a wireless device such as a mobile phone.

For performing other standard terminal functions, the processor 910 is also coupled to user input interface 918 associated with the device 900B. The user input interface 918 may include, for example, a keypad, function buttons, joystick, scrolling mechanism (e.g., mouse, trackball), touch pad/screen, voice command input, and/or other user entry mechanisms. Such user input 918 may be used by the user to, for example, select the desired avatar characteristics for his or her avatar.

A user interface (UI) 920 may be provided, which allows the user of the device 900A/B to perceive information visually, audibly, through touch, etc. For example, one or more display devices 920A may be associated with the device 900B. The display 920A can display the game/application and/or other information. A speaker(s) 920B may be provided to audibly present sounds associated with the game or application. A headset/headphone jack 920C and/or other mechanisms to facilitate audio presentations may also be provided. Other user interface (UI) mechanisms can also be provided, such as tactile 920D or other feedback.

The exemplary mobile device 900B of FIG. 9 may also include conventional circuitry for performing transmissions over the network(s) 915 and/or 916. The DSP 922 may be employed to perform a variety of functions, including analog-to-digital (A/D) conversion, digital-to-analog (D/A) conversion, speech coding/decoding, encryption/decryption, error detection and correction, bit stream translation, filtering, etc. In the case of wireless communications, the transceiver 924 includes one or both of a transmitter and receiver, thereby transmitting outgoing wireless communication signals and receiving incoming wireless communication signals, generally by way of an antenna 926. Where the device 900B is a non-mobile or mobile device, it may include a transceiver (T) 927 to allow other types of wireless, or wired, communication with networks such as the Internet. For example, the device 900B may communicate via a proximity network (e.g., IEEE 802.11 or other wireless local area network), which is then coupled to a fixed network 915 such as the Internet. Peer-to-peer networking may also be employed. Further, a wired connection may include, for example, an Ethernet connection to a network such as the Internet. These and other manners of ultimately communicating between the device 900A/B and the server(s) 950 may be implemented.

In one embodiment, the storage/memory 912 stores the various client programs and/or data used in connection with the present invention. For example, the storage/memory 912 can locally store some or all of the game/application 930 that involves the avatars as previously described. For example, some games or applications may involve locally storing some or all of the game or application, while other embodiments involve storing some or all of the game or application at the server 950. The application(s) 930 includes relevant software modules associated with the game. The application(s) 930 and relevant functional modules may be separate modules operable in connection with the processor 910, may be a single module performing each of these functions, or may include a plurality of such modules performing the various functions. It should also be recognized that one or more of these functions may be performed using hardware.

FIG. 9 also depicts a representative computing system 950 operable on the network. One or more of such systems 950 may be available via a network(s) such as the wireless 916 and/or fixed network 915. The computing system 950 represents a server(s) that can, in some embodiments, host the game or other application involving the avatars. The system 950 may be a single system or a distributed system. The illustrated computing system 950 includes a processing arrangement 952, which may be coupled to the storage/memory 954. The processor 952 carries out a variety of standard computing functions as is known in the art, as dictated by software and/or firmware instructions. The storage/memory 954 may represent firmware, media storage, and/or memory. The processor 952 may communicate with other internal and external components through input/output (I/O) circuitry 956. The computing system 950 may also include media drives 958, such as hard and floppy disk drives, CD-ROM drives, DVD drives, and other media drives capable of reading and/or storing information. In one embodiment, software for carrying out the operations at the computing system 950 in accordance with the present invention may be stored and distributed on CD-ROM, diskette, magnetic media, removable memory, or other form of media capable of portably storing information, as represented by media devices 960. Such software may also be transmitted to the system 950 via data signals, such as being downloaded electronically via a network such as the data network 915, Local Area Network (LAN) (not shown), wireless network 916, and/or any combination thereof.

The storage/memory 954 and/or media devices 960 store the various programs and data used in connection with the techniques described herein. For example, in one embodiment the storage 954 includes the game or application 972 involving avatars. The application 972 may include the functional modules previously described, such as a group recognition module, avatar characteristics presentation module, etc. Additionally, the storage/memory 954 may include the database 974A for storing data such as avatar characteristics, data identifying groups, etc. Alternatively, a database may be hosted elsewhere such as depicted by database 974B accessible via a network or otherwise.

The illustrated computing system 950 also includes DSP circuitry 966, and at least one transceiver 968 (which is intended to also refer to discrete transmitter and/or receiver components). While the server 950 may communicate with the data network 915 via wired connections, the server may also/instead be equipped with transceivers 968 to communicate with wireless networks 916 whereby an antenna 970 may be used.

It should be recognized that the game or application involving avatars may be hosted on either a device 900A/900B that is also a participant in the game/application, or the game/application may be hosted on one or more servers or other computing devices 950. The game/application may also be distributed among the devices 900A and server(s) 950, such that some execution is performed locally and some is performed remotely.

The foregoing description is illustrative and is not intended to limit the scope of the invention. Various modifications of the embodiments disclosed herein are possible, and practical alternatives to and equivalents of the various elements of the embodiments will be understood to those of ordinary skill in the art upon study of this patent document. These and other variations and modifications of the embodiments disclosed herein may be made without departing from the scope and spirit of the invention.

What is claimed is:

1. A method, comprising:
   hosting a multi-participant application in which participants are represented as avatars and the participants are not required to have a same interaction experience as any of the other participants;
   providing a set of available avatar characteristics from which participants can select to create their respective user-specific avatars;
   recognizing a plurality of the participants as affiliated with a group;
   analyzing user-specific avatars of the participants affiliated with the group;
   receiving an instruction from at least one participant affiliated with the group that selects and associates a first subset of the available avatar characteristics with the group based on the analysis; and
   after receiving the instruction, providing only the first subset of available avatar characteristics to the participants affiliated with the group, at least one avatar characteristic of the first subset being selectable by the participants affiliated with the group.

2. The method of claim 1, wherein the first subset of the available avatar characteristics includes a first avatar characteristic, the method further comprising:
   requiring participants affiliated with the group to select at least the first avatar characteristic.

3. The method of claim 1, wherein the multi-participant application comprises a multi-player game, and wherein the hosting is carried out via one or more networks.

4. The method of claim 1, wherein at least one of the participants affiliated with the group is a participant who is not a member of the group but who wishes to become a member of the group.

5. The method of claim 1, wherein analyzing user-specific avatars comprises identifying one or more common avatar characteristics of the user-specific avatars.

6. The method of claim 1, wherein recognizing a plurality of the participants as affiliated with a group comprises receiving notifications from one or more of the plurality of the participants as to which participants are to be affiliated with the group, and recognizing those participants identified by the notifications as affiliated with the group.

7. The method of claim 1, further comprising disallowing participants not affiliated with the group from selecting one or more of the first subset of the available avatar characteristics.

8. The method of claim 1, wherein the available avatar characteristics include one or more of audio characteristics and visual characteristics.

9. An apparatus, comprising:
   storage configured to store a multi-participant application in which participants are represented as avatars and the participants are not required to have a same interaction experience as any of the other participants, and
   for storing a set of available avatar characteristics from which the participants can select to create their respective avatars; and
   a processor configured to recognize a plurality of the participants as affiliated with a group, to identify common avatar characteristics selected by participants affiliated with the group, to identify from the set of available avatar characteristics a first subset of avatar characteristics associated with the group based at least in part on the identification of the common characteristics selected by the participants affiliated with the group, and to limit at least some of the avatar characteristics available to the participants affiliated with the group to the first subset of avatar characteristics,
   wherein at least one avatar characteristic of the first subset is selectable by the participants affiliated with the group.

10. The apparatus as in claim 9, further comprising a receiver to receive an indication from at least one participant affiliated with the group that specifies the first subset of avatar characteristics, and wherein the processor is configured to identify the first subset of avatar characteristics based on the received indication specifying the first subset of avatar characteristics.

11. The apparatus as in claim 9, wherein the processor is further configured to designate one or more of the first subset of available avatar characteristics as mandatory avatar characteristics for each of the participants affiliated with the group.

12. The apparatus as in claim 11, wherein the processor is further configured to allow participants affiliated with the group to select any of the available avatar characteristics that are not designated as mandatory avatar characteristics.

13. The apparatus as in claim 9, wherein the processor is further configured to designate one or more of the available avatar characteristics, that are not affiliated with the first subset, as prohibited avatar characteristics for each of the participants affiliated with the group.

14. An apparatus, comprising:
   a receiver configured to receive application information for a multi-user application in which users are represented as avatars and the users are not required to have a same interaction experience as any of the other users, the application information including at least avatar characteristics;
   a user input configured to facilitate user designation of a group of users in which to be affiliated;
   a processor configured to identify common avatar characteristics selected by users affiliated with the user designated group and to identify a set of avatar characteristics associated with the user designated group based at least in part on the identification of the common characteristics selected by the users affiliated with the group; and
   a user output configured to present the set of avatar characteristics as being available for selection by the user in response to becoming affiliated with the group,
   wherein at least one avatar characteristic of the set is selected by the participants affiliated with the group.

15. The apparatus as in claim 14, wherein the user input is further configured to facilitate user specification of which of the avatar characteristics are to be provided in the subset of avatar characteristics available for selection by all users affiliated with the group.

16. The apparatus as in claim 15, further comprising a transmitter configured to transmit the specified avatar characteristics to be provided in the subset of avatar characteristics to an application server for distribution to all users affiliated with the group.

17. The apparatus as in claim 14, further comprising:
   a transmitter to transmit the application information to other users of the multi-user application where the apparatus is designated as a host of the multi-user application; and
   storage configured to store at least the multi-user application and the set of available avatar characteristics from which the users of the multi-user application can select to create their respective avatars.

18. A non-transitory computer-readable storage medium having instructions stored thereon capable of causing a processor to:
   execute an application accessible to a plurality of users, the application being capable of representing the users to each other via user-specific avatars and the users are not required to have a same interaction experience as any of the other users, the application also being capable of associating some of the plurality of users with a group and not associating others of the plurality of users with the group;
   provide a database of available avatar characteristics that are combinable to create the user-specific avatars;
   analyze user-specific avatars of users associated with the group;
   receive an avatar instruction from at least one user associated with the group that selects and associates a first set of the available avatar characteristics with the group based on the analysis;
   restrict access for users associated with the group to the first set of the available avatar characteristics; and
   restrict access for users not associated with the group to a second set of the available avatar characteristics, the second set differing from the first set,
   wherein at least one avatar characteristic of the first subset is selectable by the users associated with the group.

19. The non-transitory computer-readable storage medium of claim 18, wherein the instructions are further capable of causing the processor to:
   present only avatar characteristics selected from the first set of available avatar characteristics for users associated with the group to select from to create their user-specific avatars, and present only avatar characteristics selected from the second set of the available avatar characteristics for users not associated with the group to select from to create their user-specific avatars.

20. The non-transitory computer-readable storage medium of claim 18, wherein the instructions are capable of causing the processor to analyze the user-specific avatars of at least some of the plurality of users by identifying one or more common avatar characteristics of the user-specific avatars.

21. An apparatus comprising:
means for hosting a multi-participant application in which participants are represented as avatars and the participants are not required to have a same interaction experience as any of the other participants;
means for providing a set of available avatar characteristics from which participants can select to create their respective user-specific avatars;
means for recognizing a plurality of the participants as affiliated with a group;
means for analyzing user-specific avatars of the participants affiliated with the group;
means for receiving an instruction from at least one participant affiliated with the group that selects and associates a first subset of the available avatar characteristics with the group based on the analysis; and
means for providing only the first subset of available avatar characteristics to the participants affiliated with the group in response to receiving the instruction,
wherein at least one avatar characteristic of the first subset is selectable by the participants affiliated with the group.

* * * * *